Aug. 25, 1959    E. BACCARI ET AL    2,901,585
GUN TYPE ELECTRIC SOLDERING IRON

Filed Oct. 24, 1955    2 Sheets-Sheet 1

INVENTORS
Ernest Baccari
Thomas J. Manse

BY *Lancaster, Allwine & Rommel*
ATTORNEYS

Aug. 25, 1959  E. BACCARI ET AL  2,901,585
GUN TYPE ELECTRIC SOLDERING IRON
Filed Oct. 24, 1955  2 Sheets-Sheet 2
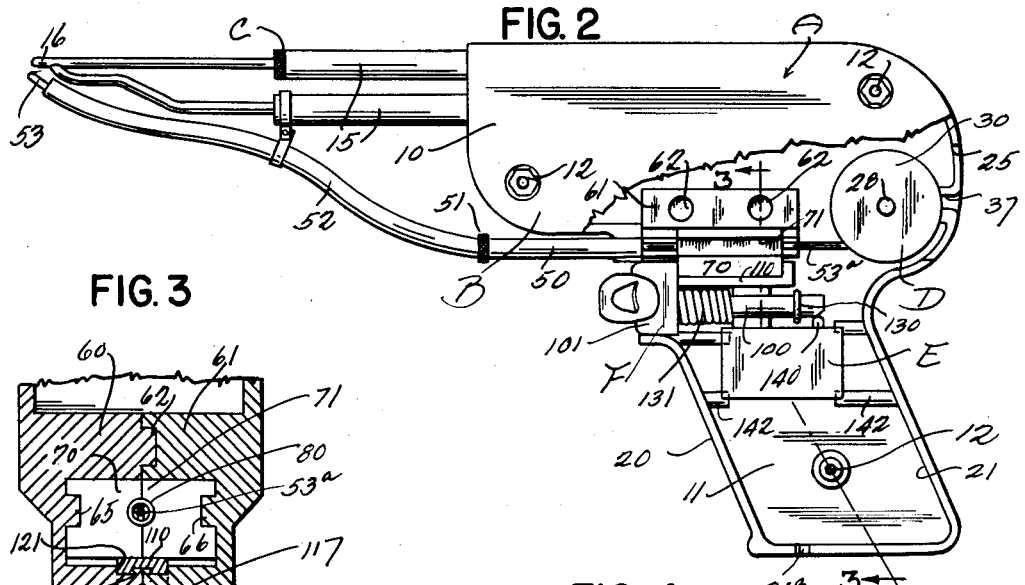
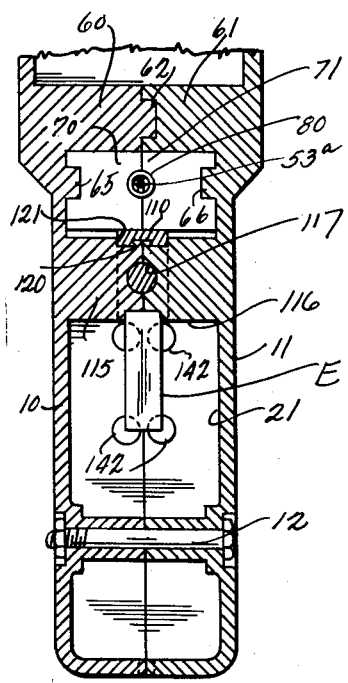
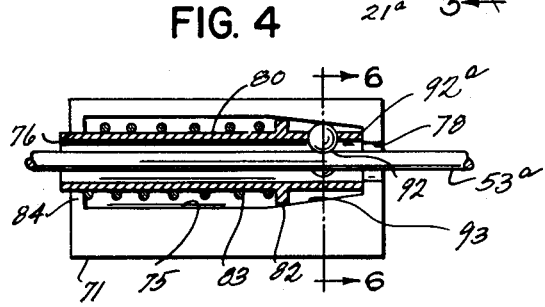
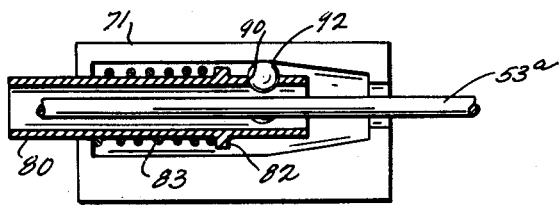
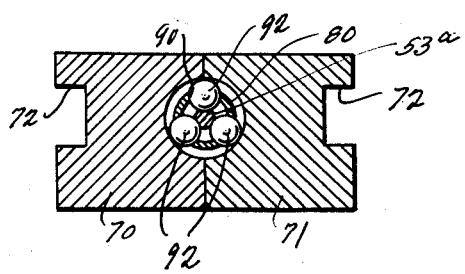
INVENTORS
Ernest Baccari
Thomas J. Manse
ATTORNEYS

United States Patent Office 2,901,585
Patented Aug. 25, 1959

2,901,585

GUN TYPE ELECTRIC SOLDERING IRON

Ernest Baccari and Thomas J. Manse,
Sault Sainte Marie, Mich.

Application October 24, 1955, Serial No. 542,283

6 Claims. (Cl. 219—27)

This invention relates to an electric soldering iron with a casing in the shape of a gun, having an electric resistance type heating unit, a spool of solder, and including improved means for feeding the solder to the heating end of the iron.

A further object of this invention is the provision of an improved type of soldering tool having improved feeder means to easily and accurately supply solder to the heated end of the iron with complete control of the amount of solder fed to the iron.

A further object of this invention is the provision of a trigger type of soldering appliance, in the shape of a pistol or a gun, having improved trigger actuated means for closing a circuit through the electric resistance unit and precise feeding of a controlled amount of solder to the heated end of the heating unit.

Other objects and advantages of this invention will be apparent during the course of the following detailed description.

In the accompanying drawings, forming a part of this specification and wherein similar reference characters designate corresponding parts throughout the several views:

Figure 2 is a view similar to Figure 1, but showing the trigger of the tool pressed by an operator's finger into position for closing a circuit through the heating element, and with the tool in position for automatic feeding of a controlled amount of solder to the heated end of the tool.

Figure 3 is an enlarged fragmentary cross sectional view taken substantially on the line 3—3 of Figure 2, but showing certain details merely in end elevation.

Figure 4 is a longitudinal cross sectional view taken through the solder feeding means or clutch in normal rest position.

Figure 5 is a longitudinal cross sectional view taken through the solder feeding details of Figure 4 immediately after they have been moved by the gun trigger to the position shown in Figure 2 for the setting of the feeding means or clutch for feed of the solder, upon release of the trigger onto the heated end of the tool.

Figure 6 is an enlarged cross sectional view taken substantially on the line 6—6 of Figure 4.

Figure 1:
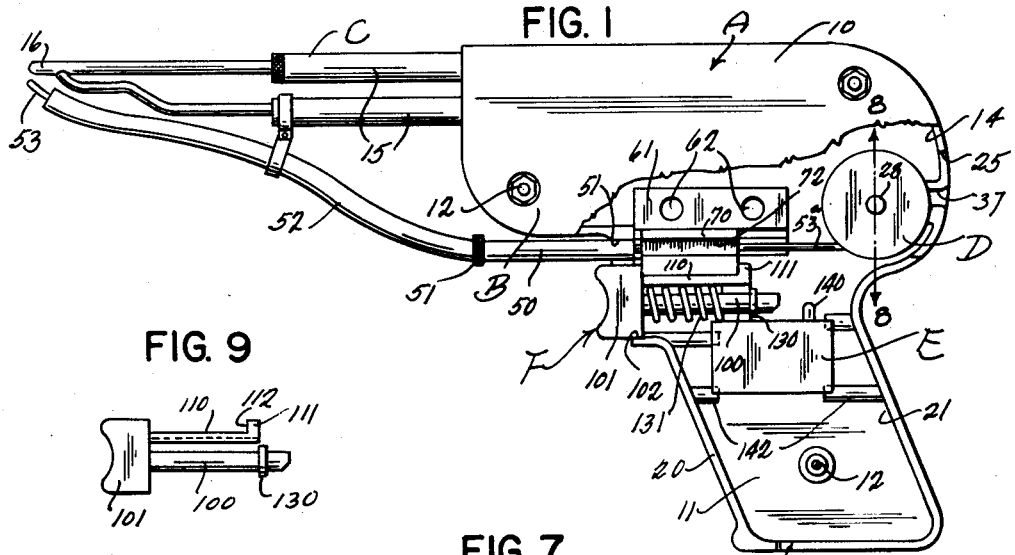
Figure 1 is a fragmentary side elevation of the appliance, showing the lower part of its casing removed to expose operating details; the latter being arranged in normal rest position.
Figure 9:
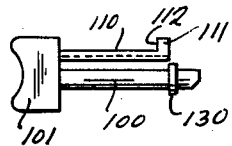
Figure 9 is a side elevation of the trigger frame mechanism.

In the drawings, wherein for the purpose of illustration is shown a preferred embodiment of the invention, the letter A may generally designate the tool or appliance. It includes a casing structure B, supporting an electric heating unit C. The tool is adapted to carry a removable solder spool or reel D and a switch mechanism E; an improved trigger means F being provided for actuation of the switch and the feeding of solder from the spool D, in a controlled amount to the heated end of the electric heating unit C.

Referring to the casing structure B, the same may be constructed of any approved material, but preferably we use heat resistant plastic. The casing is divided into halves 10 and 11, as shown in the cross sectional view of Figure 3. They are held together by suitable removable bolts 12, such as shown in cross section in Figure 3. The casing portions 10 and 11 when assembled provide an upper chamber 14 adapted to receive the electric heating unit C, which may be of purely conventional construction and including the tubular portions 15 which terminate in a heating tip 16. The handle construction 20 of the casing B is hollow, defining a chamber 21 which receives the various details of the reel D, trigger means F, and switch means E.

Figure 7:
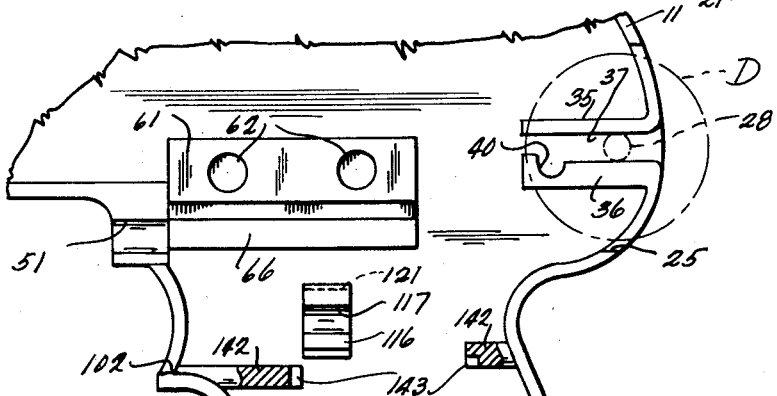
Figure 7 is a fragmentary view of one side of the handle portion of the soldering tool, with all movable parts removed and showing the various frame guides and supporting means for the detachable and movable details of the tool.
Figure 8:
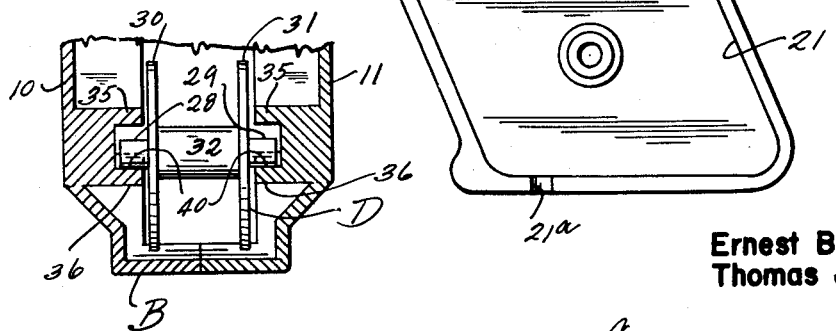
Figure 8 is a fragmentary cross sectional view taken substantially on the line 8—8 of Figure 1, showing a solder reel or spool supported in the casing of the tool.

The casing portions 10 and 11 are formed to provide means for supporting the solder reel or spool D. To that end at the rear of the gun an opening 25 is provided for entrance and removal of the spool D. The latter includes hub portions 28 and 29, outer sides flanges 30 and 31 and a shaft 32 to receive a coil of ordinary flexible solder wire. Spools D are easily inserted in and removed from the casing B without dismantling the casing. The sections 10 and 11 are provided with upper and lower spaced track flanges 35 and 36, shown best in Figures 7 and 8 of the drawings. They define between them trackways 37 which receive the hubs 28 and 29 of the spool D. The track flanges 36 at their ends are downwardly notched at 40 to permit the hubs 28 and 29 to drop therein and seat the spool D in position so that the same will not easily move along the trackways nor drop through the opening 25 during use of the iron, and so that it may be rotated without lengthwise movement, to uncoil the solder wire therefrom. For removal, the gun may be inverted to permit the hubs of the spool to drop out of the bearing sockets or notches 40 and by tipping the casing, the spool will roll backwards along the trackways 37 and through the opening 25 (see dot and dash lines in Figure 7).

A tube or sleeve 50 is connected in an opening 51 between the casing sections 10 and 11, in rigid position. At its outer end it has a coupling 51 for detachable connection with a bendable sleeve or tube 52 through which the solder may be threaded for accurate direction of the end 53 to the heated tip 16.

Referring to the trigger means F, for the feeding of the strip of solder 53ᵃ from the spool D, sections 10 and 11, as shown in Figure 3 and elsewhere, are provided with elongated inwardly extending flanges 60 and 61. They have interfitting studs and sockets 62 which accurately align the same. Below these flanges 60 and 61 are inwardly extending spaced tracks 65 and 66 for slidably receiving the solder feeding clutch or gripping means. The casing of this clutch (see Figs. 4 and 5) may comprise half sections 70 and 71 with longitudinal grooves 72 upon the outer sides thereof for receiving therein the tracks 65 and 66 respectively, as is shown in Figure 3 of the drawings. This casing may be formed of one piece if so desired, but for purposes of easy access to the mechanism therein division of the same into halves has been shown in the drawings.

The casing sections 70 and 71 define therebetween an elongated chamber 75, the inner end of which is provided with a restricted opening 76 and the outer end of which also has a restricted opening 78, through which the strip solder 53ª extends from the spool D for lengthwise extension through the chamber 75. An elongated sleeve or tube 80 is provided for lengthwise movement in the chamber 75, having one end bearing in the opening 76 for such purpose. The tube 80 has an external annular flange 82 against which one end of a spiral compression spring 83 bears; the opposite end of said spring bearing against the wall 84 in which the opening 76 is provided. The sleeve 80, remote from the trigger of the gun, is provided with an annular series of radial sockets 90 adapted to receive a plurality of spheres 92, resembling ball bearings, which normally enter the passageway 92ª of the sleeve 80 and through which the solder 53ª extends, for resting in bearing relation against the outer surface of the solder strip 53ª. The end of the passageway 75, remote from the trigger, is tapered and convergently reduced in diameter, as shown at 93, and against which the clutch balls 92 engage. The spring 83 normally forces the sleeve towards the reduced end of the passageway 75 for the purpose of forcing balls 92 into firm frictional engagement with the solder strip.

The frame of trigger mechanism F includes a horizontal shaft 100 and a finger engaging head 101 which normally slidably operates in an opening 102, in the handle of the casing, as shown in various views in the drawings.

The trigger construction furthermore includes a rigid support 110 paralleling shaft 100, having an upward extension 111 at its inner end and thus defining a socket 112 adapted to detachably receive the clutch casing for movement with the trigger frame. As a means to accurately guide the trigger frame, the sections 10 and 11 are provided with inward extensions 115 and 116, shown in Figures 3 and 7 of the drawings. They have inner facing surfaces providing a passageway 117 for slidably receiving the plunger shaft 100 of the trigger frame. The support 110 for the clutch casing is provided with a dove tail slot on the under side thereof for receiving a dove tailed projection, shown in Figure 3, at 120, formed inwardly of the recess 121 in which the clutch supporting extension 110 slides. A stop flange 130 is provided upon the trigger shaft 100 to limit the outward movement of the trigger frame. A compressed spiral spring 131 is disposed upon the trigger shaft 101, engaging the trigger head 101 at one end and at its other end engaging the flanges 115 and 116. This spring 131 normally forces the trigger outwardly to the position shown in Figure 1, and at which time the clutching mechanism has its parts arranged as shown in Figure 4.

In order to feed the solder strip end 53 onto the tip 16 of the solder iron or tool the operator presses the trigger head 101, to the position shown in Figure 2, in which the operator's finger is shown as having compressed the spring 131. Due to inertia of the sleeve 80 when this pressing of the trigger inwardly occurs, movement of the clutch sleeve casing will release the detents 92 from engagement with the strip 53ª, to substantially the position shown in Figure 5. There will be a quick release of the detent balls 92 with respect to the wire 53ª, and when the operator releases the trigger for return to the position shown in Figure 1, balls 92 will be forced into frictional clamping engagement with strip 53ª and the force of the spring 131 will move the strip for feed at 53 to the iron.

The circuit for electric heating unit C may include a completely enclosed reset switch E which has a depressible switch finger 140 with only an operating tip thereof exposed in the casing. The casing of this switch E is narrow and of rectangular shape. The sections 10 and 11 of the casing structure of the appliance may be provided with inwardly extending switch supporting flanges 142 provided with sockets 143 for removably receiving the reset switch. The switch finger or button 140 is in line with the trigger shaft or plunger 100; the inner end of the latter being tapered to engage and depress the switch button 140 at the inner position of the trigger as shown in Figure 2, for the purpose of closing a circuit through the electric heating unit C.

In operation it is merely necessary for the operator to grasp the handle structure 20 in his hand, and press the trigger, as shown in Figure 2. Releasing it will feed the solder strip at 53 onto the tip 16, to the desired extent. A number of these movements may be made if found necessary. The operator holds the trigger closed in the position shown in Figure 2 for heating the electric unit to the desired extent. Of course, feed of the solder strip to the tip 16 may be effected at any time merely by pressing the trigger and releasing it.

It will be apparent from the foregoing that a very compact and simple gun type electric soldering iron has been provided, the parts of which are readily accessible and removable for replacement or repairs, including means to effectively hold the solder strip spool in position for replacement.

Various changes in the shape, size and arrangement of parts may be made to the form of invention herein shown and described without departing from the spirit of the invention or scope of the claims.

I claim:

1. In an electric soldering gun, the combination of a casing structure having a chamber therein, and an opening at the rear of said chamber leading into said chamber, an electric resistant type heating unit carried by the casing including a solder melting tip, guide means for directing a solder strip into melting proximity to said tip, clutch means upon the casing for engaging the solder strip, trigger means mounted upon the casing for effecting operation of the clutching means to grip and move the strip into feeding relation with the heating tip, a spool of strip solder material having hub extensions at the outer sides thereof, elongated trackways carried by the casing adjacent to said opening for slidably and removably receiving the hubs of said spool, said trackways having bearing sockets spaced from said opening for rotatably supporting said spool when in its feeding position against lengthwise movement along the trackways, said opening to said chamber being sufficient to permit easy entrance and access of the spool with respect to said chamber and the trackways.

2. A soldering tool comprising a casing structure in the shape of a pistol having a hand clasping portion and a chamber therein, an electric type resistance unit supported by said casing including a solder melting tip, said casing structure being divided into separable halves with means to normally clamp the same together to provide said chamber therebetween, means on the casing structure for removably and rotatably supporting a spool of coiled solder strip, means carried by the casing to guide the solder strip to the heating tip, a trigger carried by the casing having a rectilinear sliding movement upon the handle, spring means normally forcing the trigger outwardly from the chamber, a slidable clutch casing carried by the trigger for movement therewith, said clutch casing having a chamber therein, a clutch in said casing including a sleeve provided with a passageway therethrough and means for supporting detent balls for radial movement so the same may enter the passageway, the solder strip being extended through said passageway, the clutch casing having a tapered surface in position to engage the balls for controlling their radial movement, spring means normally urging the sleeve along the clutch casing for movement of the balls against the tapered surface for forcing them into clutching engagement with the solder strip, the said tapered surface being so positioned that upon actuation of the trigger to retract it into the casing the balls will be released from the clutching engagement with the solder strip.

3. A solder gun as described in claim 2 in which the circuit for the electric resistance unit includes a reset switch having a movable circuit actuating part in position to be engaged by the trigger upon its retraction into the casing for closing a circuit through said electric resistance unit.

4. In a pistol type soldering gun the combination of a casing having a barrel portion and a handle portion having a chamber therein, electrically actuated heating means supported by the barrel portion, a rectilineal slidable trigger portion mounted upon the handle portion of the casing having spring means normally forcing it to extended operating position, means in the chamber of the casing for rotatably supporting a spool of strip solder, guide means carried by the casing for directing the strip of solder to the melting tip of the heating means, and an electric circuit actuating reset switch in the chamber, including an operating member in the path of the rectilineally moving trigger for actuation upon depression of the trigger.

5. A soldering gun as described in claim 4 in which clutch means is provided with means for actuating the solder strip into feeding relation with respect to the heating means upon an extended movement of said trigger means from a retracted to an extended position.

6. A gun type soldering tool comprising a casing structure in the shape of a pistol having a hand clasping portion provided with a chamber therein, an electric type resistance unit supported by the casing including a solder melting tip, means on the casing structure to support a strip of solder for guidance to the heating tip, a movable trigger carried by the casing, spring means normally forcing the trigger to an extended position, a clutch casing carried by the trigger for movement therewith, said clutch casing having a chamber therein, a sleeve like member provided with a passageway therethrough and located in said clutch casing for relative movement with respect thereto, and detent balls supported for radial movement through said sleeve and within said clutch casing so the same may enter the sleeve passageway, said solder strip supported by the handle being adapted for extension through said sleeve passageway, the clutch casing having an internal tapered surface in position to engage the balls for controlling their radial movement, spring means in the clutch casing normally urging the sleeve along the clutch casing for moving the balls against said tapered surface for forcing them into clutching engagement with the solder strip, said tapered surface being so positioned that upon actuation of the trigger to retract it into the casing the balls will be freed from clutching engagement with the solder strip and upon release of the trigger for extension thereof from the handle the clutch casing will be moved with the trigger for forcing the tapered surface against the balls and into clutching engagement with said solder strip for feed extension of the strip.

References Cited in the file of this patent

UNITED STATES PATENTS

| | | |
|---|---|---|
| 1,832,850 | Audino | Nov. 24, 1931 |
| 1,851,420 | Carson | Mar. 29, 1932 |
| 2,251,557 | Weston | Aug. 5, 1941 |
| 2,405,866 | Weller | Aug. 13, 1946 |
| 2,643,321 | Greene | June 23, 1953 |
| 2,765,390 | Chapel et al. | Oct. 2, 1956 |
| 2,789,198 | Dye et al. | Apr. 16, 1957 |

FOREIGN PATENTS

| | | |
|---|---|---|
| 494,419 | Great Britain | Oct. 21, 1938 |
| 507,997 | Great Britain | June 22, 1939 |
| 638,043 | Germany | Nov. 9, 1936 |